United States Patent
Yu et al.

(10) Patent No.: US 9,974,039 B2
(45) Date of Patent: May 15, 2018

(54) USER EQUIPMENT AND METHOD FOR MEASUREMENT OF SIDE-LINK REFERENCE SIGNAL RECEIVED POWER (S-RSRP)

(71) Applicant: Intel IP Corporation, Santa Clara, CA (US)

(72) Inventors: Zhibin Yu, Dresden (DE); Qing Xu, Unterhaching (DE); Tianyan Pu, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 58 days.

(21) Appl. No.: 14/977,463

(22) Filed: Dec. 21, 2015

(65) Prior Publication Data

US 2017/0181011 A1    Jun. 22, 2017

(51) Int. Cl.
```
H04W 56/00     (2009.01)
H04L 27/26     (2006.01)
H04L 5/00      (2006.01)
H04W 52/04     (2009.01)
```

(52) U.S. Cl.
CPC .......... *H04W 56/0055* (2013.01); *H04L 5/00* (2013.01); *H04L 5/0048* (2013.01); *H04L 27/2601* (2013.01); *H04W 52/04* (2013.01)

(58) Field of Classification Search
CPC . H04W 24/02; H04W 24/10; H04W 56/0055; H04L 5/0048; H04L 27/2601
See application file for complete search history.

(56) References Cited

U.S. PATENT DOCUMENTS

| | | | |
|---|---|---|---|
| 9,571,217 B2* | 2/2017 | Sagong et al. | H04J 11/005 |
| 2016/0135066 A1* | 5/2016 | Xu et al. | H04B 17/318 370/252 |
| 2017/0013595 A1* | 1/2017 | Jung et al. | H04W 72/02 |
| 2017/0019795 A1* | 1/2017 | Takahashi | H04W 16/18 |
| 2017/0036503 A1* | 2/2017 | Murakami et al. | B62K 25/06 |
| 2017/0063503 A1* | 3/2017 | Liu et al. | H04L 5/0048 |
| 2017/0078863 A1* | 3/2017 | Kim et al. | H04W 48/16 |
| 2017/0094702 A1* | 3/2017 | Yasukawa et al. | H04W 76/023 |
| 2017/0126306 A1* | 5/2017 | Kim et al. | H04B 7/15507 |

FOREIGN PATENT DOCUMENTS

CN    106993260 A    7/2017

OTHER PUBLICATIONS

Schlienz, J. et al., "Device to Device Communication in LTE", Rohde & Schwarz, published Sep. 29, 2015, https://www.rohde.schwarz.com/us/applications/device-to-device-communication-in-lte-white-paper_230854-142855.html, accessed Jun. 16, 2017, pp. 1-36.*

* cited by examiner

*Primary Examiner* — Luat Phung
*Assistant Examiner* — Thomas R Cairns
(74) *Attorney, Agent, or Firm* — Schwegman Lundberg & Woessner, P.A.

(57) ABSTRACT

Embodiments of a User Equipment (UE) and methods for determination of a side-link reference signal received power (S-RSRP) are disclosed herein. The UE may receive a signal from a second UE as part of a device-to-device (D2D) communication. The UE may determine a resource element (RE) block size to be used for a determination of the S-RSRP. The RE block size may be based on a delay spread of a channel between the UE and the second UE. The UE may determine the S-RSRP based on multiple summations, sizes of which may be based on the determined RE block size.

24 Claims, 9 Drawing Sheets

USER EQUIPMENT AND METHOD FOR MEASUREMENT OF SIDE-LINK REFERENCE SIGNAL RECEIVED POWER (S-RSRP)

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to device-to-device (D2D) communication, including communication over side-link channels.

BACKGROUND

Mobile devices may communicate with a wireless network for exchanging various types of data and other traffic. In some cases, demand for data throughput for the mobile devices may be high and may even exceed an available system throughput for the network. As an example, the network may support mobile devices located in relatively close proximity to each other, some of which may exchange data with each other through the network. The network may become congested or overloaded in some cases, such as when the number of mobile devices supported becomes large. Accordingly, there is a general need for methods and systems of enabling communication for the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
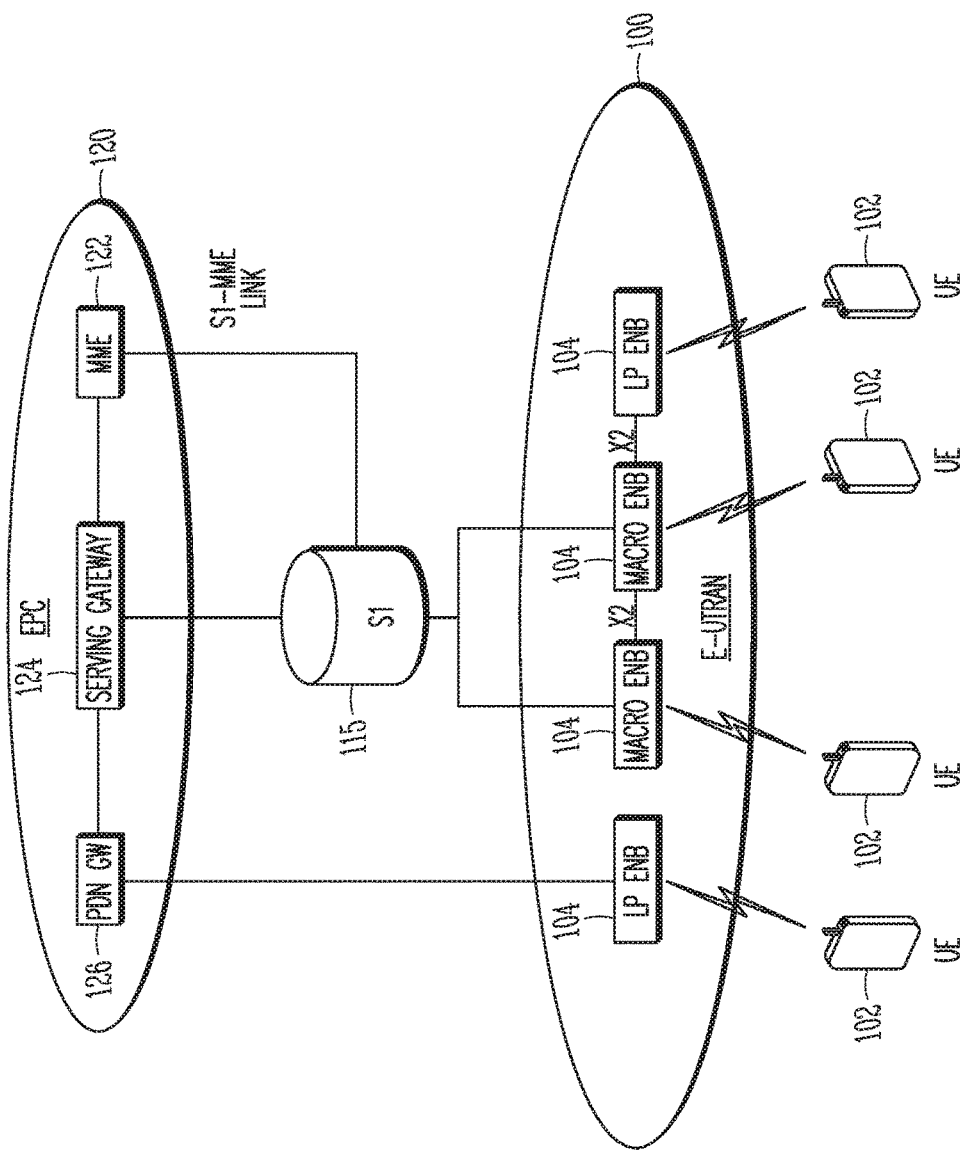
FIG. 1 is a functional diagram of a 3GPP network in accordance with some embodiments.

FIG. 1 is a functional diagram of a mobile communication network, such as 3GPP network in accordance with some embodiments. It should be noted that embodiments are not limited to the example 3GPP network shown in FIG. 1, as other networks may be used in some embodiments. As an example, a Fifth Generation (5G) network may be used in some cases. Such a 5G network or other network may or may not include some or all of the components shown in FIG. 1, and may include additional components and/or alternative components in some cases.

The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs.

In some embodiments, the UE 102 may receive, from a second UE 102, one or more signals as part of a device-to-device (D2D) communication. The UE 102 may determine a side-link reference signal received power (S-RSRP) measurement for the reception. In some embodiments, the UE 102 may receive one or more signals from the eNB 104 and may determine an RSRP for the reception. The UE 102 may transmit the determined RSRP to the eNB 104 as part of a control message. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1).

The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
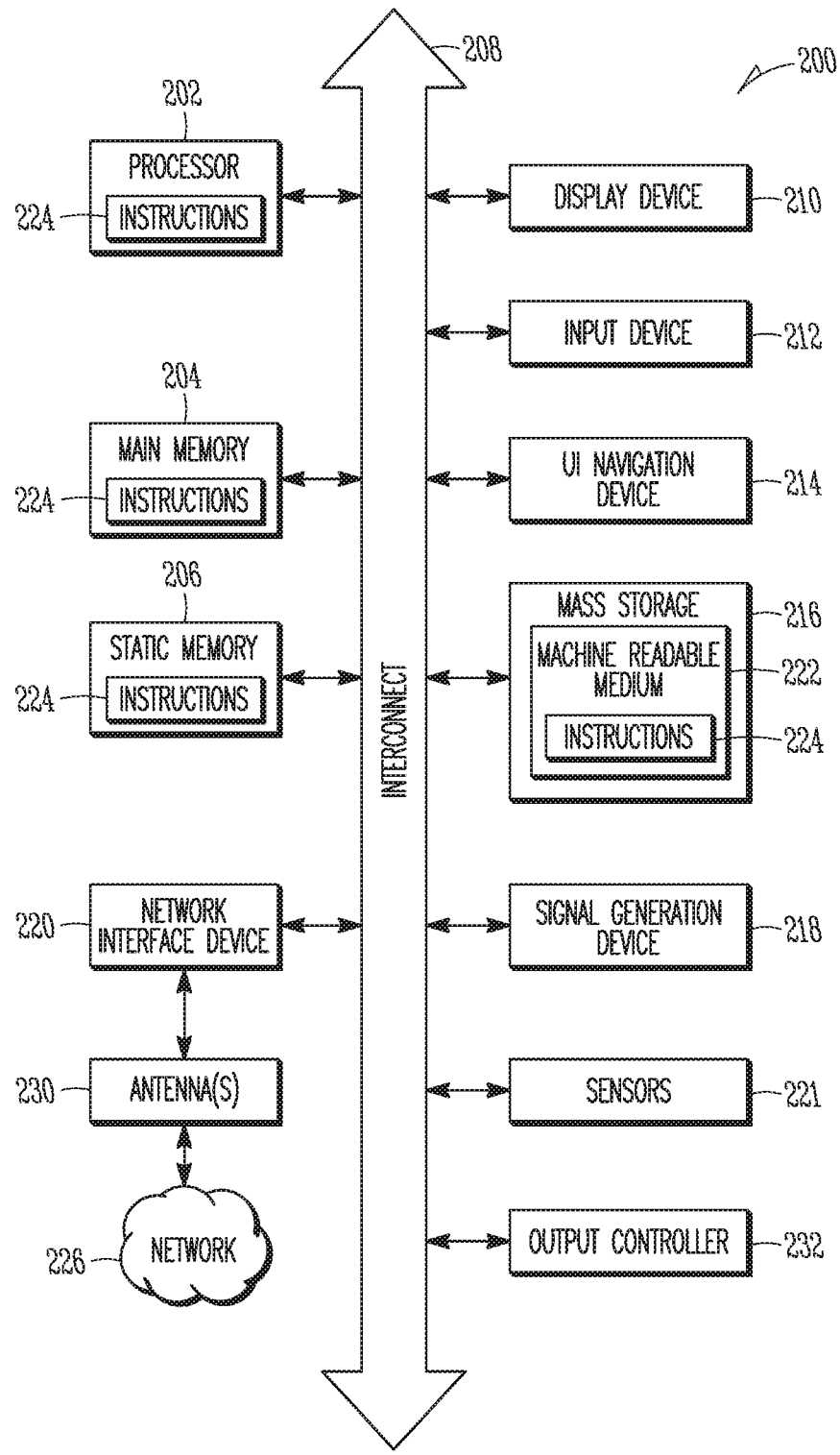
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
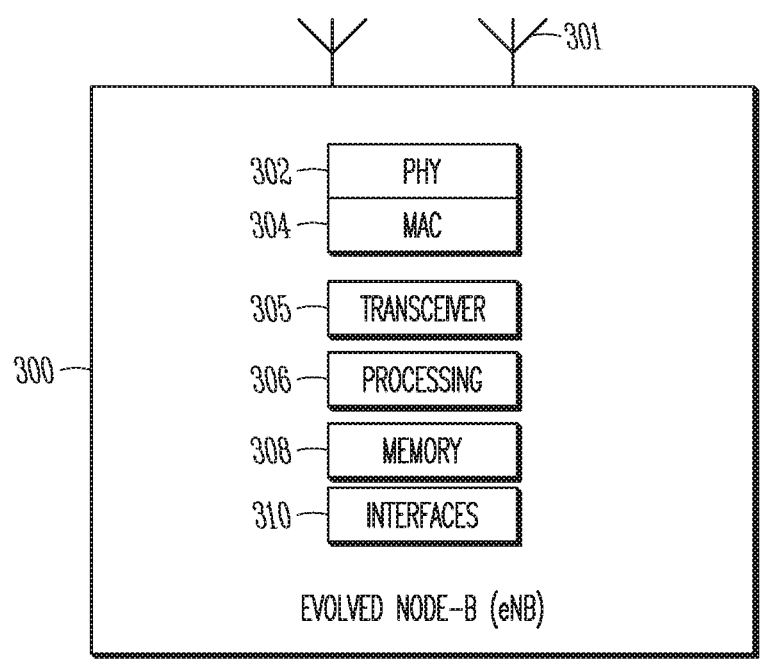
FIG. 3 is a block diagram of an Evolved Node-B (eNB) in accordance with some embodiments.

FIG. 3 is a block diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 or both.

Figure 4:
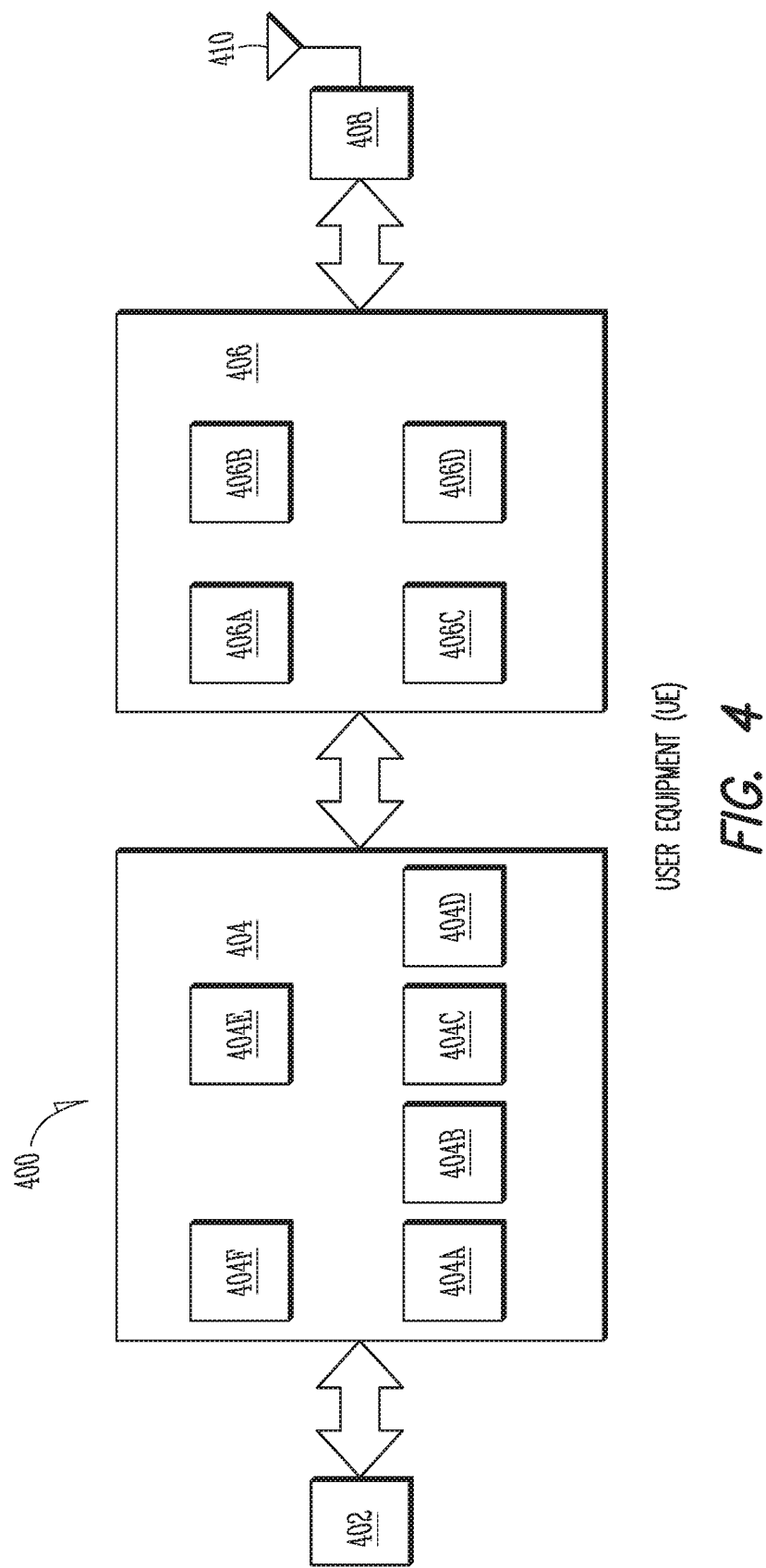
FIG. 4 is a block diagram of a User Equipment (UE) in accordance with some embodiments.

FIG. 4 is a block diagram of a User Equipment (UE) in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, "transceiver circuitry" may include one or more elements and/or components, some or all of which may be included in the RF circuitry 406 and/or the FEM circuitry 408. These examples are not limiting, however, as the processing circuitry and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

The antennas 230, 301, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 230, 301, 410 may be effectively separated to take advantage of spatial diversity and the different channel characteristics that may result.

In some embodiments, the UE 400 and/or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 400 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 400 and/or eNB 300 and/or machine 200 may include various components of the UE 200 and/or the eNB 300 and/or the machine 200 as shown in FIGS. 2-4. Accordingly, techniques and operations described herein that refer to the UE 400 (or 102) may be applicable to an apparatus for a UE. In addition, techniques and operations described herein that refer to the eNB 300 (or 104) may be applicable to an apparatus for an eNB.

In accordance with some embodiments, the UE 102 may receive a signal from a second UE 102 as part of a device-to-device (D2D) communication. The UE 102 may determine a resource element (RE) block size to be used for a determination of the S-RSRP. The RE block size may be based on a delay spread of a channel between the UE 102 and the second UE 102. The UE 102 may determine the S-RSRP based on multiple summations, sizes of which may be based on the determined RE block size. These embodiments will be described in more detail below.

Figure 5:
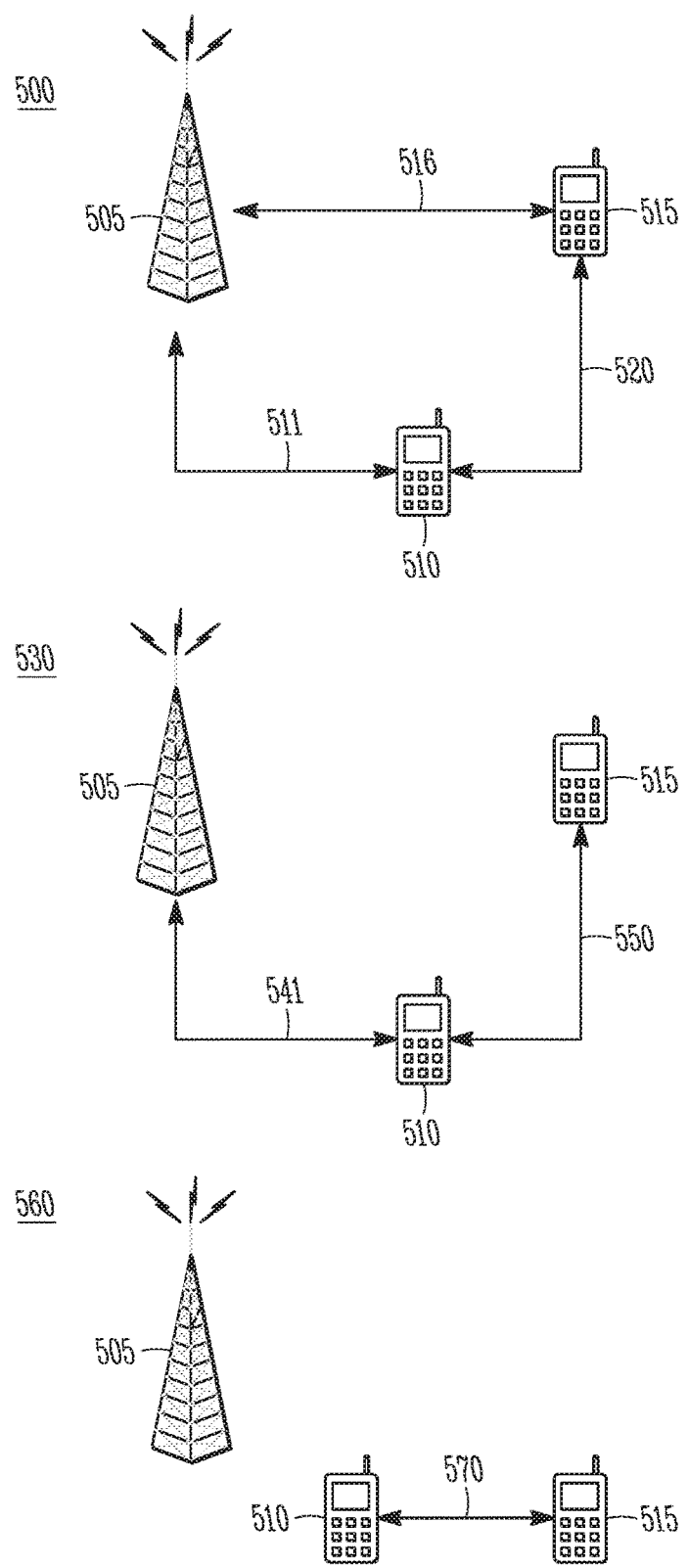
FIG. 5 illustrates example scenarios in which UEs may be in communication with an eNB and with each other in accordance with some embodiments.

FIG. 5 illustrates example scenarios in which UEs may be in communication with an eNB and with each other in accordance with some embodiments. Although the example scenarios 500, 530, 560 shown in FIG. 5 may illustrate some aspects of techniques disclosed herein, it is understood that embodiments are not limited to the example scenarios 500, 530, 560. Techniques and scenarios discussed are not limited to the number or types of eNBs and UEs shown in the example scenarios 500, 530, 560 as any suitable number or types may be used. For instance, the eNB 505 is not limited to the tower configuration shown. In some cases, the eNB 505 may be an eNB 104 while the UEs 510, 515 may be UEs 102, and in-network communication sessions between the eNB 505 and UEs 510, 515 may take place over a network such as 100.

Direct connections between the UEs 510, 515 or other UEs may also be supported in some embodiments. Such communication may be referred to as device-to-device (D2D) communication in some cases. In some embodiments, D2D communication may include communication of side-link signals, communication according to various side-link frame formats and/or usage of other side-link techniques. In some embodiments, D2D communication sessions may be at least partly established through exchanging of control messages and/or other messages between the UEs 510, 515 and the eNB 505. In some cases, in-network and D2D communication sessions may take place simultaneously, but may occur exclusively in other cases.

The example scenario 500 may illustrate an "in-coverage D2D" scenario. Accordingly, UEs involved in such scenarios may be in coverage of the network and may also support D2D communication with each other. In the example scenario 500, a D2D communication session between the UEs 510, 515 may take place over the link 520 in addition to in-network communication sessions that may be supported by the UEs 510, 515 over the links 511 and 516, respectively.

The example scenario 530 may illustrate a "partial out-of-coverage D2D" scenario. Accordingly, a portion of UEs involved in such scenarios may be in coverage of a network while a portion of the UEs may be out of coverage of the network. In the example scenario 530, a D2D communication session between the UEs 510, 515 may take place over the link 550. An in-network communication session with the eNB 505 may be supported by the UE 510 over the link 541. The UE 515 may be out of coverage of the eNB 505 in the example scenario 530.

The example scenario 560 may illustrate an "out-of-coverage D2D" scenario. Accordingly, UEs involved in such scenarios may be out of coverage of a network. In the example scenario 560, a D2D communication session between the UEs 510, 515 may take place over the link 570. However, the UEs 510 and 515 may be out of coverage of the eNB 505 in the example scenario 560.

In some embodiments, time resources, such as time transmission intervals (TTIs) or other time periods, may be reserved for operations used for D2D communication. In addition, channel resources (or frequency resources) may also be reserved in some embodiments, including one or more channels, sub-channels, sub-carriers, resource elements (REs), resource blocks (RBs) or other frequency unit. As an example, time resources and/or channel resources may be reserved by a network such as 100 for exchanging of D2D control messages between UEs 102. As another example, time resources and/or channel resources may be reserved by the network for exchanging of data payloads messages between the UEs 102. Examples of such will be described below.

Figure 6:
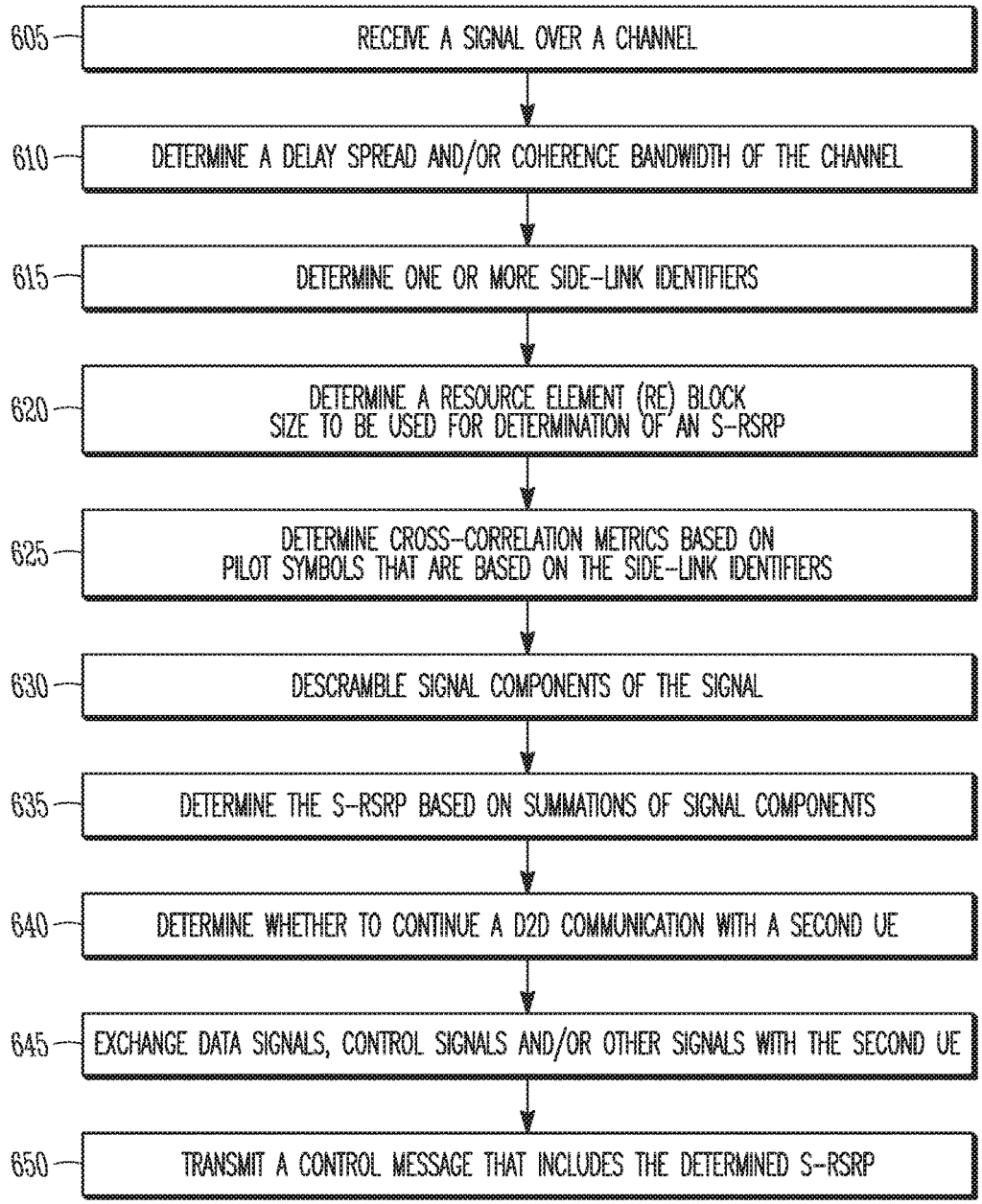
FIG. 6 illustrates the operation of a method of communication in accordance with some embodiments.

FIG. 6 illustrates the operation of a method of communication in accordance with some embodiments. It is important to note that embodiments of the method 500 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5 and 7-9, although it is understood that the method 600 may be practiced with any other suitable systems, interfaces and components.

In addition, while the method 600 and other methods described herein may refer to eNBs 104 or UEs 102 operating in accordance with 3GPP or other standards, embodiments of those methods are not limited to just those eNBs 104 or UEs 102 and may also be practiced on other devices, such as a Wi-Fi access point (AP) or user station (STA). In addition, the method 600 and other methods described herein may be practiced by wireless devices configured to operate in other suitable types of wireless communication systems, including systems configured to operate according to various IEEE standards such as IEEE 802.11. The method 600 may also refer to an apparatus for a UE 102 and/or eNB 104 and/or other device described above.

It should also be noted that some techniques and/or operations described as part of the method 600 may be applicable to device-to-device (D2D) communication between one or more UEs 102 in some cases, although embodiments are not limited to D2D communication and/or D2D operation. In some cases, some or all techniques and/or operations described regarding the method 600 and other methods may be applicable to communication between a mobile device and a network, such as a communication between a UE 102 and an eNB 104.

At operation 605 of the method 600, the UE 102 may receive a signal over a channel. In some embodiments, the signal may be received from a second UE 102 over a wireless channel between the UE 102 and the second UE 102. As an example, the signal (and/or other signals) may be transmitted by the second UE 102 as part of a D2D communication between the UE 102 and the second UE 102. As another example, the signal (and/or other signals) may be transmitted by the second UE 102 to enable synchronization in time and/or frequency by the UE 102 for a D2D communication. As another example, the signal (and/or other signals) may be transmitted to enable determination, by the UE 102, of a side-link RSRP (S-RSRP), other signal power measurement and/or other signal quality measurement.

Any suitable format may be used for signals exchanged between the UEs 102. In some embodiments, the signal may be based at least partly on a group of demodulation reference symbols (DMRS). For instance, an orthogonal frequency division multiplexing (OFDM) signal may be transmitted and/or received in channel resources (frequency resources) that may include multiple resource elements (REs) or sub-carriers. Some or all of the REs in the channel resources may be allocated for transmission of the DMRS in some cases. As an example, the DMRS may include or may be based on a Zadoff-Chu (ZC) sequence or other sequence. For instance, the ZC sequence may include a sequence of complex numbers that may be mapped to the allocated REs in a manner that may be known or may be determined by both a transmitting UE 102 and a receiving UE 102.

In some embodiments, the DMRS may be based on a sequence that may be generated using one or more suitable functions. As an example, the block may be generated by a formula or other technique. For instance, in some cases, such a formula may be based on a seed value or other initialization value, such as a side-link ID or other ID of the UE 102. It should be noted that embodiments are not limited to usage of DMRS, however, as other pilot symbols, training symbols and/or other symbols may be used in some cases. For instance, cell-specific reference symbols (CRS) may be used in some embodiments. In some cases, the CRS may be transmitted by the eNB 104 as part of in-network communication and the UE 102 may use techniques described herein to determine an RSRP, which may be a legacy RSRP.

Figure 7:
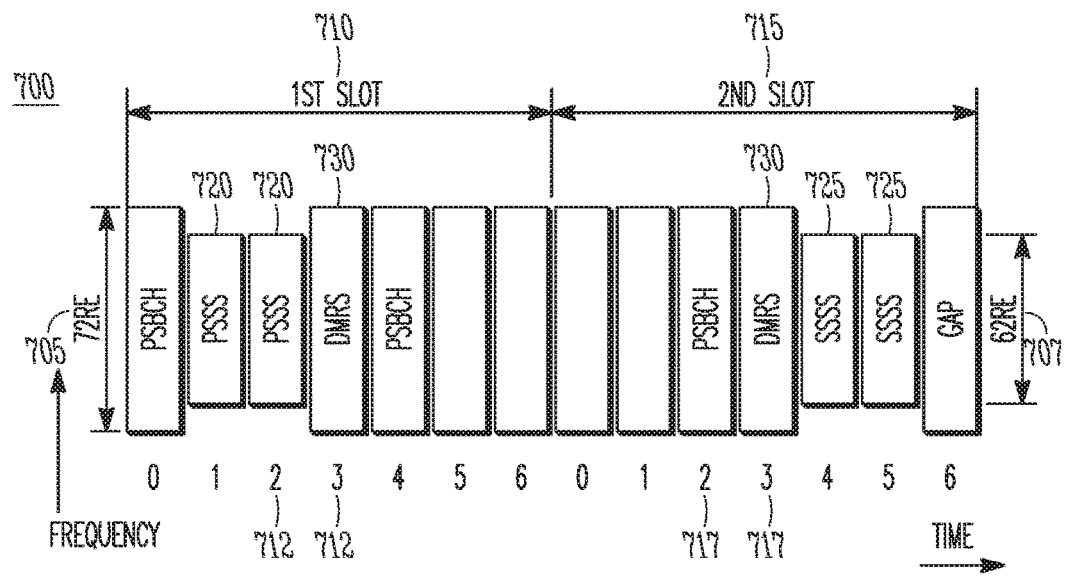
FIG. 7 illustrates example side-link sub-frame formats in accordance with some embodiments.
Figure 7:
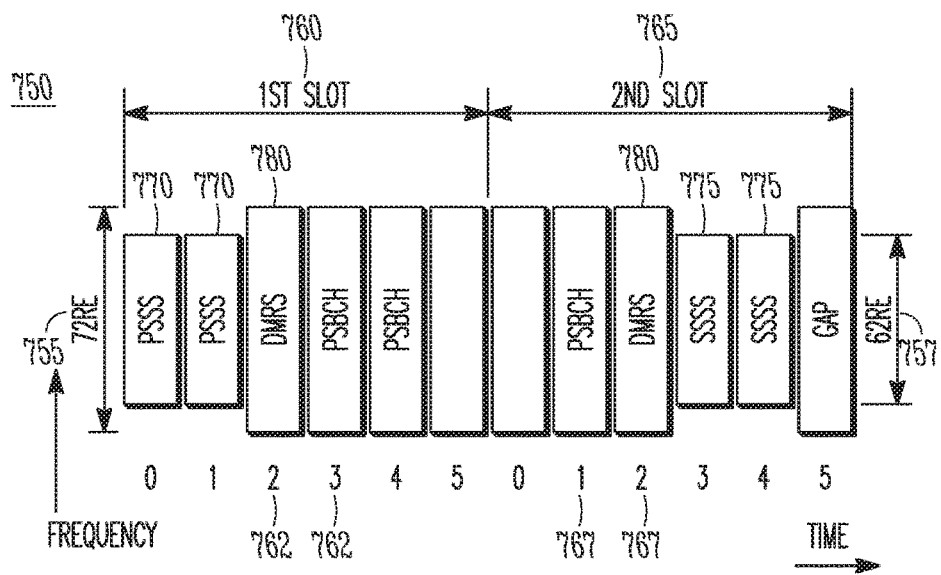

FIG. 7 illustrates example side-link sub-frame formats in accordance with some embodiments. In the example side-link synchronization sub-frame (SLSS) formats 700 and 750, OFDM techniques and/or single-carrier frequency division multiple access (SC-FDMA) techniques may be used in some cases, although it is understood that embodiments are not limited to the usage of OFDM or SC-FDMA. It should be noted that embodiments are not limited by the ordering, arrangement, number, size, duration and/or type of elements, frames and/or symbols shown in the example SLSS formats 700 and 700 in FIG. 7. Although the example SLSS formats 700 and 750 may be included in a 3GPP LTE standard or other standard, embodiments are also not limited to usage of formats that are included in standards.

The example SLSS format 700 may be used in accordance with a normal cyclic prefix (CP) length and the example SLSS format 750 may be used in accordance with an extended cyclic prefix (CP) length. Accordingly, the SLSS format 700 may include 7 OFDM symbol periods 712, 717 per slot 710, 715 and the SLSS format 750 may include 6 OFDM symbol periods 762, 767 per slot 760, 765. In both SLSS formats 700, 750, some of the OFDM symbol periods may use 72 REs (as indicated by 705, 755) while other OFDM symbol periods may use 62 REs (as indicated by 707, 757). As an example, OFDM symbol periods allocated for Primary Synchronization Signals (PSSS) 720, 770 and/or Secondary Synchronization Signals (SSSS) 725, 775 may use 62 REs. As another example, OFDM symbol periods allocated for DMRS 730, 780 may use 72 REs. As another example, in some OFDM symbol periods, a portion of the allocated and/or available REs may actually be used for transmission of data. For instance, one or more REs may be used for other purposes or may be unused (such as a direct current (DC) RE) in some cases.

In some cases, it may be assumed that a D2D signal timing and/or side-link IDs have already been determined. Such determination operations may be performed using PSSS and/or SSSS, although embodiments are not limited as such. As previously described, the DMRS may be transmitted using OFDM techniques in which a sequence is mapped to the REs allocated for the DMRS. As a non-limiting example, all 72 REs may be used for the sequence.

As an example, when the SLSS format 700 is used, the receiving UE 102 may extract time domain signals during either or both of the OFDM symbols 730 to the frequency domain to produce a block of signal components that are based on the DMRS (from the transmit side). The receiving UE 102 may descramble the signal components using the DMRS and may perform additional operations such as those described below. For instance, when the DMRS is based on a ZC sequence of complex numbers, the descrambling may include multiplication of the signal components by complex conjugates of the sequence.

At operation 610, the UE 102 may determine a delay spread and/or coherence bandwidth of the channel. The determination may be based on the received signal from the second UE 102 and may be performed using any suitable technique. As an example, a PSSS and/or SSSS may be used. As another example, the delay spread may be determined and the coherence bandwidth may be inversely related to the determined delay spread.

At operation 615, the UE 102 may determine one or more side-link identifiers (ID) of other UEs 102. For instance, a target side-link ID for the second UE 102 may be determined and one or more colliding side-link IDs for other UEs 102 (other than the second UE 102) may be determined. As an example, the PSSS and/or SSSS may be used for such determinations.

At operation 620, the UE 102 may determine an RE block size to be used for determination of the S-RSRP. In some embodiments, the RE block size may be determined based at least partly on the delay spread and/or coherence bandwidth of the channel between the UE 102 and the second UE 102. As an example, when the delay spread is large and/or the coherence bandwidth is small, a relatively small value for the RE block size may be selected. When the delay spread is small and/or the coherence bandwidth is large, a larger value for the RE block size may be selected. These examples are not limiting, however, as other techniques and/or other factors may be used.

It should be noted that in some cases, reference may be made to either an "RE block size" or a "block averaging filter size" or similar, but it is understood that such references are not limiting, and such terms may be used interchangeably in some cases. For instance, summations may be performed in some operations described herein, and a number of terms in the summation may be related to the RE block size and/or block averaging filter size.

The RE block size (or block averaging filter size) may be determined using any suitable operations and/or techniques, examples of which will be presented below. At operation 625, cross-correlation metrics may be determined for different candidate values of the RE block size. As a non-limiting example, a maximum RE block size may be based on the delay spread and/or coherence bandwidth. A group of candidate values of the RE block size may include some or all values less than or equal to the maximum RE block size. In some embodiments, operation 625 may be performed as part of the determination of the RE block size. However, embodiments are not limited as such, and some embodiments may not necessarily include operation 625.

It should be noted that the RE block size (or block averaging filter size) may be configurable in some cases. In some embodiments, the determination of the RE block size may be performed in real-time. As an example, a determined delay spread may be used to select a maximum candidate RE block size. Cross-correlation metrics between detected side-link IDs may be determined for candidate RE block sizes less than the maximum candidate RE block size. The selected RE block size may be based on the cross-correlation metrics. For instance, the selected RE block size may be one for which the cross-correlation metrics is low and/or minimum.

In some embodiments, the determination may be performed offline. As an example, as part of an offline determination, a worst-case assumption of delay spread may be used in such cases to generate the maximum candidate RE block size. In some cases, a set of cross-correlation metrics between all possible combinations of DMRS (or ZC sequences, for instance) for all candidate RE block sizes may be determined. In some cases, the set of cross-correlation metrics between combinations of DMRS (or ZC sequences, for instance) related to detected side-link IDs for all candidate RE block sizes may be determined. The selection of the RE block size to be used may be based on the determined set of cross-correlation metrics. For instance, the selected RE block size may be one for which the cross-correlation metrics is low and/or minimum.

In some embodiments, a pre-determined value of the RE block size may be used. Although not limited as such, the value may be based on simulation, analysis and/or other techniques which may be performed offline. As an example, when 72 REs are used for a group of DMRS based on ZC sequences, a value of 12 REs for the RE block size may be used. These examples are not limiting, however, as other predetermined values may be used in some cases. In addition, embodiments are not limited to usage of the techniques described above for generation of such predetermined values.

In some embodiments, such composite cross-correlation metrics may be based on summations of individual (symbol-by-symbol) cross-correlations between ideal DMRS signal components for different possible DMRS blocks. For instance, a side-link ID of the second UE 102 may be used to generate a first group of DMRS of the UE 102. Other possible side-link IDs and/or detected side-link IDs of other UEs 102 may be used to generate additional possible groups of DMRS. Individual cross-correlations between the modulated symbols of the DMRS may be formed between all possible combinations of DMRS, in some cases. A subset of such may also be used, such as all cross-correlations between the DMRS of the second UE 102 and all possible other DMRS.

As an example, for a first and second DMRS, a composite cross-correlation metric for a particular candidate RE block size may be based on one or more summations of individual cross-correlation product terms. For example, the individual cross-correlation product term may be based on a product of a modulated symbol of the first DMRS and a complex conjugate of a modulated symbol of the second DMRS.

The composite cross-correlation metric may be formed based on multiple summations of the individual cross-correlation product terms. The number of individual cross-correlation product terms used in the summations may be restricted to be less than or equal to the particular candidate RE block size being evaluated. As a non-limiting example, the composite cross-correlation metric for a particular candidate RE block size may be based on magnitude-squared values of the summations.

As a non-limiting example, when N REs are used for the DMRS (or other symbols) and a value of L is used as the RE block size, a cross-correlation metric for a first and second DMRS (with the kth RE of each denoted as S1(k) and S2(k)) may be determined as $$\frac{1}{N}\left(\sum_{m=0}^{p-1}\frac{1}{L}\left|\sum_{k=mL+1}^{k-mL+1}S_1(k)S_2^*(k)\right|^2 + \frac{1}{N-pL}\left|\sum_{k=pL+1}^{k-N}S_1(k)S_2^*(k)\right|^2\right)$$

It should be noted that embodiments are not limited by the example cross-correlation formula given above. As an example, some embodiments may use different scaling values. As another example, some embodiments may modify the above formula to produce a cross-correlation metric that may still depend on the same and/or similar summations shown in the above formula.

It should also be noted that S1(k) and S2(k) may refer to colliding DMRS symbols from two D2D transmitters that have been detected. For instance, S1(k) and S2(k) may be related to DMRS from two D2D transmitters for the kth RE during a same OFDM symbol period of the SLSS.

Figure 8:
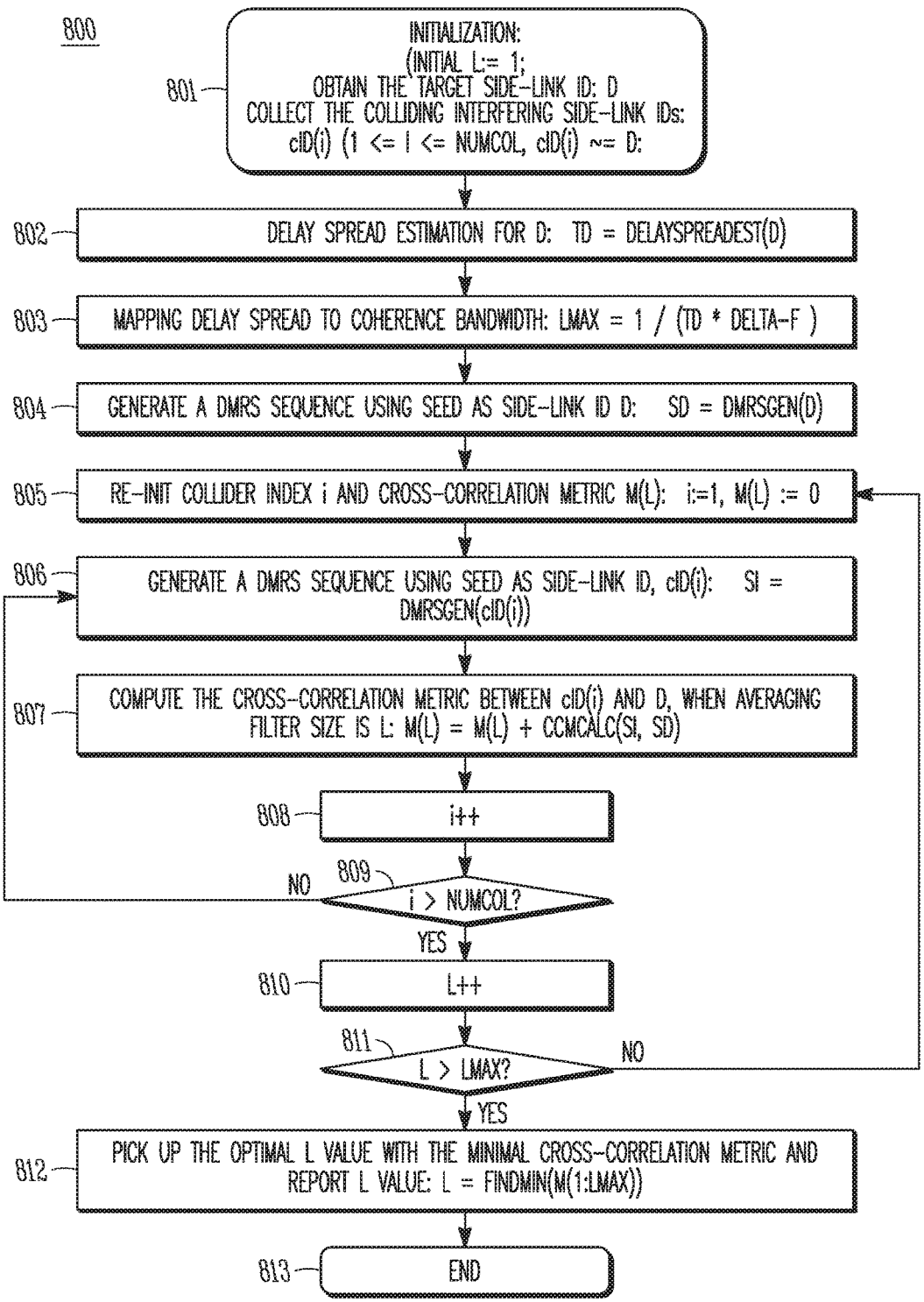
FIG. 8 illustrates example operations that may be performed as part of generation of a resource element (RE) block size in accordance with some embodiments.

FIG. 8 illustrates example operations that may be performed as part of generation of a resource element (RE) block size in accordance with some embodiments. In some cases, techniques and concepts described herein may be applicable to some embodiments of method 800, including the DMRS, S-RSRP, synchronization signals, D2D communication, side-link techniques and others. In addition, some embodiments of the method 800 may include fewer or additional operations than what is shown in FIG. 8. It is also understood that embodiments are not limited to the chronological order of operations shown in FIG. 8. In addition, example logic flows that may be shown in FIG. 8 and/or described regarding the method 800 are also not limiting. Some embodiments may include one or more operations from one or more of the methods 600 and/or 800 and/or others, and may also include other operations in some cases. In addition, embodiments are not limited to parameters, such as initialization parameters and/or others, as shown in FIG. 8. Although operations of the method 800 may be performed at the UE 102, it is understood that embodiments are not limited to usage of UEs 102 and/or eNBs 104. In addition, some or all operations of the method 800 may be related to D2D communication in some cases, but embodiments are not limited to D2D communication.

The method 800 may be used to determine and/or select a value "L" that may be used as an RE block size for determination of an S-RSRP using techniques such as those described herein or others. At operation 801, an initialization of the variable L to a value of 1 may be performed. A target side-link ID (denoted as "d") may be obtained. The target side-link ID may be an ID of the second UE 102 for which the S-RSRP is to be determined. In addition, colliding interfering side-link IDs (denoted as "cID") may be obtained. The colliding side-link IDs may include IDs of UEs 102 other than the second UE 102. Those other UEs 102 may be synchronized in time and/or frequency, in some cases, with the D2D signals being exchanged between the UE 102 and the second UE 102. As an example, the side-link IDs may be detected using PSSS/SSSS detection techniques that may include reception of the PSSS and/or SSSS as shown in FIG. 8.

At operation 802, a delay spread estimate td may be determined. As an example, the delay spread may be estimated based on received samples of the PSSS and/or SSSS and/or DMRS. Any suitable techniques for delay spread estimation may be used. In some cases, a maximum possible delay spread may be used, such as half of a cyclic prefix length. Other predetermined values may also be used in some cases.

At operation 803, a coherence bandwidth Lmax may be generated. As an example, the coherence bandwidth may be related to the estimated and/or assumed delay spread td may through a relationship such as Lmax=1/(td*delta_f), where delta_f may be a sub-carrier spacing. For instance, a 15 kHz spacing as used LTE standards or other standards, may be used.

At operation 804, an ideal DMRS sequence may be generated based on the target side link ID d. As a non-limiting example, techniques and/or formulas that may be included in a 3GPP LTE standard or other standard may be used. For instance, the DMRS sequences may be based on ZC sequences, although embodiments are not limited to ZC sequences.

Operations 805-811 may loop over some or all possibilities of block averaging filter size. For each possible block averaging filter size L, operations 805-811 may loop over all available colliding side link IDs, generate ideal DMRS sequences for each, compute a DMRS cross-correlation metric between the target side-link ID d and each colliding interfering side-link ID, and combine (accumulate) them per possible value of L.

At operation 812, the UE 102 may determine and/or select a block averaging filter size L based at least partly on the cross-correlation metrics. As an example, the value L of the candidate group for which the cross-correlation metric is minimized may be selected. As another example, a value L for which the cross-correlation metric is lower than a threshold may be selected. These examples are not limiting, however, as the selection of L may be based on any suitable criteria related to the cross-correlation metrics.

Returning to the method 600, at operation 630, signal components of the received signal may be descrambled. At operation 635, the S-RSRP may be determined based on summations. The side-link RSRP (S-RSRP), RSRP, other signal quality measurement and/or other signal power measurement may be determined using any suitable operations and/or techniques, examples of which will be presented below.

It should be noted that, in some embodiments, the signal received in a particular time period (such as a sub-frame that may include symbol periods allocated for PSSS, SSSS and/or DMRS) may be used for determination of any or all of delay spread, side-link identifiers, timing, RE block size and/or S-RSRP. However, such embodiments are not limiting, as signals received in multiple time periods (such as multiple sub-frames) may be used in some embodiments. For instance, one or more parameters may be determined based on a first signal received during a first time period and one or more other parameters may be determined based on a second signal received during a second time period.

As previously described, the signal may be received from the second UE 102 in some embodiments, and may be based on DMRS that are based on a side-link ID of the second UE 102. For instance, the DMRS may be based on a ZC sequence, and the signal components may be descrambled by multiplication by complex conjugates of the ZC sequence values. The descrambled signal components may be used as part of the determination of the S-RSRP in some cases.

In some embodiments, the S-RSRP may be determined based on one or more summations of signal components of the signal (or related versions of the signal components, such as descrambled signal components). In some embodiments, the descrambling at operation 630 may be performed as part of the determination of the S-RSRP. However, embodiments are not limited as such, and some embodiments may not necessarily include operation 630.

As a non-limiting example, when N REs are used for the DMRS (or other symbols) and a value of L is used as the RE block size, the S-RSRP may be determined as $$S - RSRP = \frac{1}{N}\left(\sum_{m=0}^{p-1} \frac{1}{L}\left|\sum_{k=mL+1}^{k=mL+L} Y(k)\right|^2 + \frac{1}{N - pL}\left|\sum_{k=pL+1}^{k=N} Y(k)\right|^2\right)$$

In this formula, the value p may be determined as p=floor (N/L). In addition, the Y(k) may be based on a signal component of the kth RE, such as a descrambled signal component or other suitable component. It should be noted that the summations in the example S-RSRP formula are restricted to a number of terms that is less than or equal to L. That is, each summation may be performed on received frequency domain samples that are restricted to a frequency range, which may be related to the coherence bandwidth. In addition, each summation may use adjacent groups of REs in some cases. In some embodiments, the groups of REs used for the summations may be non-overlapping, although embodiments are not limited to a non-overlapping division of the REs for the summations.

It should be noted that embodiments are not limited by the example S-RSRP formula given above. As an example, some embodiments may use different scaling values. As another example, some embodiments may modify the above formula to produce an S-RSRP that may still depend on the same and/or similar summations shown in the above formula.

Figure 9:
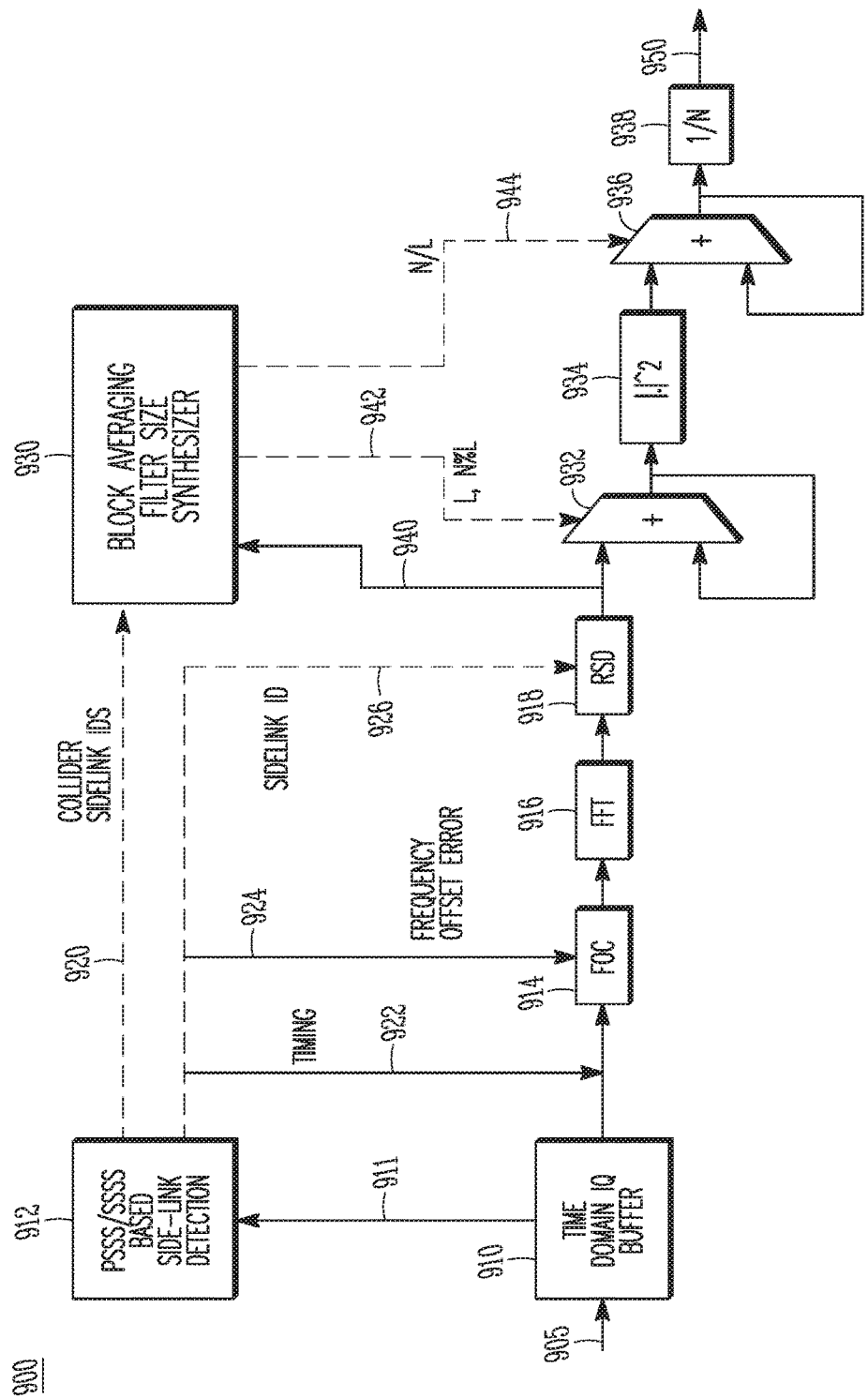
FIG. 9 illustrates example operations that may be performed as part of generation of a side-link reference signal received power (S-RSRP) in accordance with some embodiments.

FIG. 9 illustrates example operations that may be performed as part of generation of a side-link reference signal received power (S-RSRP) in accordance with some embodiments. As an example, the arrangement of operations and/or modules as shown in FIG. 9 may provide an implementation of the previous formula (or similar formula) for S-RSRP. In some cases, techniques and concepts described herein may be applicable to some embodiments of method 900, including the DMRS, S-RSRP, PSSS, SSSS, D2D communication, side-link techniques and others. In addition, some embodiments of the method 900 may include fewer or additional operations and/or modules than what is shown in FIG. 9. It is also understood that embodiments are not limited to the arrangement of modules or to any chronological order of operations shown in FIG. 9. In addition, example logic flows that may be shown in FIG. 9 and/or described regarding the method 900 are also not limiting. Some embodiments may include one or more operations from one or more of the methods 600 and/or 800 and/or 900 and/or others, and may also include other operations in some cases. Although operations of the method 900 may be performed at the UE 102, it is understood that embodiments are not limited to usage of UEs 102 and/or eNBs 104. In addition, some or all operations of the method 900 may be related to D2D communication in some cases, but embodiments are not limited to D2D communication.

A time domain in-phase/quadrature (IQ) buffer 910 may be used for various operations such as to receive, store, input, output and/or forward IQ samples. As an example, IQ samples may be input to the detector 912 from the IQ buffer 910, and the detector 912 may perform operations such as PSSS/SSSS based timing detection, side-link ID detection and/or others. The detector 912 may provide outputs such as collider side-link IDs, a timing value, a frequency offset error, a side-link ID of a received D2D signal and/or others, as shown by 920-926 in FIG. 9. Such outputs may be used as inputs for various modules and/or operations, such as frequency offset correction (FOC), Fast Fourier Transform (FFT), reference symbol descrambling (RSD) and/or others, such as shown by 914-918 in FIG. 9.

In addition, the block averaging filter size synthesizer 930 may receive these inputs, related inputs and/or other inputs, including but not limited to collider side-link IDs 920 and descrambled outputs 940 as shown in FIG. 9. Values such as a block averaging size L may be determined using techniques such as those described herein and/or others. In addition, other values may be determined, such as a remainder and a whole number that result from dividing N (a total number of REs allocated for the DMRS) by the determined value of L. These values and/or others may be used along with operations such as those shown in 932-938 to produce one or more outputs 950.

Returning to the method 600, at operation 640, the UE 102 may determine whether to continue a D2D communication with the second UE 102. Such determination may be based on the determined S-RSRP in some cases. As an example, if the S-RSRP is sufficiently high (such as above a threshold), it may be determined that the D2D communication may be successful. If the S-RSRP is low (such as below a threshold), it may be determined that the D2D communication is to be discontinued. In addition, the UE 102 may determine S-RSRP values for multiple UEs 102, in some cases. For instance, the UE 102 may determine to have a D2D communication with one or more UEs 102 that has a relatively high determined S-RSRP.

At operation 645, the UE 102 may exchange data signals, control signals and/or other signals with the second UE 102. As an example, such signals may be exchanged as part of the D2D communication when it is determined that the D2D communication is to proceed. At operation 650, the UE 102 may transmit a control message (such as a measurement report or other) that may include and/or indicate the determined S-RSRP. As an example, for a D2D communication, the UE 102 may transmit a control message to the second UE 102, eNB 104 or other component that indicates the determined S-RSRP.

It should also be noted that some or all techniques described herein may be used as part of in-network communication between the UE 102 and the eNB 104, in some embodiments. Accordingly, an RSRP may be determined using some or all techniques described herein for determination of the S-RSRP. Although pilot symbols (such as DMRS), synchronization signals (such as PSSS and/or SSSS), side-link sub-frames and/or other concepts described regarding D2D communication may be used for such in-network communication, embodiments are not limited as such. For instance, the eNB 104 may transmit a signal based on different pilot symbols and/or pilot RE locations, and an RSRP may be determined based on a modified version of the previously described formula.

In Example 1, an apparatus for a User Equipment (UE) may comprise hardware processing circuitry and transceiver circuitry. The hardware processing circuitry may be configured to determine, based at least partly on a delay spread of a channel between the UE and a second UE, a resource element (RE) block size to be used for a determination of a side-link reference signal received power (S-RSRP). The hardware processing circuitry may configure the transceiver circuitry to receive, from the second UE as part of a device-to-device (D2D) communication with the second UE, a signal that is based at least partly on a group of demodulation reference symbols (DMRS), the signal received in channel resources comprising multiple REs, a portion of which are allocated for the DMRS. The hardware processing circuitry may be further configured to determine the S-RSRP based on one or more summations of received signal values for the portion of the REs allocated for the DMRS, the summations based on the RE block size.

In Example 2, the subject matter of Example 1, wherein the signal may be further received according to a side-link synchronization sub-frame (SLSS) format.

In Example 3, the subject matter of one or any combination of Examples 1-2, wherein the group of DMRS may be based on a Zadoff-Chu (ZC) sequence that is based on a side-link identifier of the second UE.

In Example 4, the subject matter of one or any combination of Examples 1-3, wherein the signal may be further based at least partly on a primary synchronization signal (PSSS) and/or a secondary synchronization signal (SSSS). The hardware processing circuitry may be further configured to determine, based on a reception of the PSSS and/or the SSSS, the side-link identifier of the second UE and side-link identifiers of one or more colliding UEs.

In Example 5, the subject matter of one or any combination of Examples 1-4, wherein the S-RSRP may be further based on magnitude-squared values of summations of received signal values descrambled by the DMRS.

In Example 6, the subject matter of one or any combination of Examples 1-5, wherein the signal may be further based at least partly on a primary synchronization signal (PSSS) and/or a secondary synchronization signal (SSSS). The hardware processing circuitry may be further configured to determine the delay spread based on a reception of the PSSS and/or the SSSS.

In Example 7, the subject matter of one or any combination of Examples 1-6, wherein the group of DMRS may be a first group of DMRS based on a side-link identifier of the second UE. The hardware processing circuitry may be further configured to determine a cross-correlation metric for each of a group of candidate RE block sizes. The cross-correlation metric for each candidate RE block size may be based on multiple summations of products of the first group of DMRS and one or more other groups of DMRS. The summations may be based at least partly on the candidate RE block size. The RE block size to be used for the determination of the S-RSRP may be selected from the group of candidate RE block sizes based on the determined cross-correlation metrics.

In Example 8, the subject matter of one or any combination of Examples 1-7, wherein the cross-correlation metric for each candidate RE block size may be further based on magnitude-squared values of the summations of the products.

In Example 9, the subject matter of one or any combination of Examples 1-8, wherein a maximum RE block size may be based on the delay spread. The candidate RE block sizes in the group may be less than or equal to the maximum RE block size.

In Example 10, the subject matter of one or any combination of Examples 1-9, wherein the hardware processing circuitry may be further configured to determine the first group of DMRS based on a side-link identifier of the second UE and to determine the other groups of DMRS based on side-link identifiers of colliding UEs.

In Example 11, the subject matter of one or any combination of Examples 1-10, wherein the summations of the received signal values may be restricted to a number of REs less than or equal to the RE block size.

In Example 12, the subject matter of one or any combination of Examples 1-11, wherein the received signal values for the REs allocated for the DMRS may be grouped according to adjacent RE groupings.

In Example 13, the subject matter of one or any combination of Examples 1-12, wherein the UE may be arranged to operate according to a Third Generation Partnership Project (3GPP) Long Term Evolution (LTE) protocol.

In Example 14, the subject matter of one or any combination of Examples 1-13, wherein the hardware processing circuitry may include baseband circuitry to determine the S-RSRP.

In Example 15, the subject matter of one or any combination of Examples 1-14, wherein the apparatus may further include one or more antennas coupled to the transceiver circuitry for the reception of the signal.

In Example 16, a non-transitory computer-readable storage medium may store instructions for execution by one or more processors to perform operations for communication by a User Equipment (UE). The operations may configure the one or more processors to configure the UE to receive an orthogonal frequency division multiplexing (OFDM) signal in channel resources comprising multiple resource elements (REs). Signal components for at least a portion of the REs may be based on a group of pilot symbols. The operations may further configure the one or more processors to descramble received OFDM signal components for the portion of the REs using the group of pilot symbols. The operations may further configure the one or more processors to determine a reference signal received power (RSRP) based on summations of blocks of the descrambled received OFDM signal components. The summations may be grouped according to an RE block size.

In Example 17, the subject matter of Example 16, wherein the operations may further configure the one or more processors to determine, for each of a group of candidate RE block sizes, a cross-correlation metric between the group of pilot symbols and one or more other groups of pilot symbols. The operations may further configure the one or more processors to select, from the group of candidate RE block sizes and based on a minimum of the cross-correlation metrics, the RE block size to be used to determine the RSRP.

In Example 18, the subject matter of one or any combination of Examples 16-17, wherein a maximum value of the group of candidate RE block sizes may be based at least partly on a delay spread and/or a coherence bandwidth for the OFDM signal.

In Example 19, the subject matter of one or any combination of Examples 16-18, wherein the OFDM signal may be received, from a second UE, as part of a device-to-device (D2D) communication between the UE and the second UE. The pilot symbols may include a group of demodulation reference symbols (DMRS) that are based on a side-link identifier of the second UE. The RSRP may include a side-link RSRP (S-RSRP).

In Example 20, the subject matter of one or any combination of Examples 16-19, wherein the operations may further configure the one or more processors to determine whether to continue the D2D communication with the second UE based at least partly on the determined S-RSRP.

In Example 21, the subject matter of one or any combination of Examples 16-20, wherein the summations may be grouped according to an RE block size of 12 REs.

In Example 22, the subject matter of one or any combination of Examples 16-21, wherein the OFDM signal may be received from an Evolved Node-B (eNB). The operations may further configure the one or more processors to configure the UE to transmit, to the eNB, a measurement report that includes the determined RSRP.

In Example 23, a method of side-link reference signal received power (S-RSRP) determination at a User Equipment (UE) may comprise determining, based at least partly on a delay spread of a channel between the UE and a second UE, a resource element (RE) block size to be used for a determination of a side-link reference signal received power (S-RSRP). The method may further comprise receiving, from the second UE, a signal that is based at least partly on a group of demodulation reference symbols (DMRS), the signal received in channel resources comprising multiple REs, a portion of which are allocated for the DMRS. The method may further comprise determining the S-RSRP based on one or more summations of received signal values for REs allocated for the DMRS, the summations based on REs spaced by less than or equal to the RE block size.

In Example 24, the subject matter of Example 23, wherein the UE may be arranged to operate according to a Third Generation Partnership Project (3GPP) Long Term Evolution (LTE) protocol. The signal may be received as part of a device-to-device (D2D) communication with the second UE. The signal may be received according to a side-link synchronization sub-frame (SLSS) format.

In Example 25, the subject matter of one or any combination of Examples 23-24, wherein the S-RSRP may be further based on magnitude-squared values of the summations of the received signal values descrambled by the DMRS.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a mobile device the apparatus comprising hardware processing circuitry and transceiver circuitry, the hardware processing circuitry configured to:
   determine a resource element (RE) block size for determining a side-link reference signal received power (S-RSRP) based at least partly on a delay spread of a channel between the mobile device and a second mobile device and a plurality of cross-correlations of a group of demodulation reference symbols (DMRS) of the second mobile device with respective groups of DMRS of one or more colliding mobile devices, the plurality of cross-correlations corresponding to respective candidate RE block sizes;
   configure the transceiver circuitry to receive, from the second mobile device as part of a device-to-device (D2D) communication with the second mobile device, a signal based at least partly on the group of DMRS of the second mobile device, wherein the signal is received in channel resources comprising multiple REs, a portion of the multiple REs being allocated for the group of DMRS of the second mobile device; and
   determine the S-RSRP based on one or more summations of values of the received signal for the portion of the REs allocated for the group of DMRS of the second mobile device, wherein the one or more summations are based on the RE block size.

2. The apparatus according to claim 1, wherein the signal is further received according to a side-link synchronization sub-frame (SLSS) format.

3. The apparatus according to claim 1, wherein the group of DMRS of the second mobile device is based on a Zadoff-Chu (ZC) sequence that is based on a side-link identifier of the second mobile device.

4. The apparatus according to claim 3, wherein:
   the signal is further based at least partly on a primary synchronization signal (PSSS) or a secondary synchronization signal (SSSS), and
   the hardware processing circuitry is further configured to determine, based on a reception of the PSSS or the SSSS, the side-link identifier of the second mobile device and side-link identifiers of the one or more colliding mobile devices.

5. The apparatus according to claim 1, wherein the S-RSRP is further based on magnitude-squared values of summations of received signal values descrambled by the group of DMRS of the second mobile device.

6. The apparatus according to claim 1, wherein:
   the signal is further based at least partly on a primary synchronization signal (PSSS) or a secondary synchronization signal (SSSS), and
   the hardware processing circuitry is further configured to determine the delay spread based on a reception of the PSSS or the SSSS.

7. The apparatus according to claim 1, wherein:
   the group of DMRS of the second mobile device is a first group of DMRS based on a side-link identifier of the second mobile device,
   the hardware processing circuitry is further configured to determine a cross-correlation metric for each candidate RE block size of a group of candidate RE block sizes, wherein the cross-correlation metric for each candidate RE block size is based on multiple summations of products of the group of DMRS of the second mobile device and the groups of DMRS of the one or more colliding mobile devices, wherein the multiple summations are based at least partly on the candidate RE block size, and
   wherein the candidate RE block size for determining the S-RSRP is selected from the group of candidate RE block sizes based on the cross-correlation metrics.

8. The apparatus according to claim 7, wherein the cross-correlation metric for each candidate RE block size is further based on magnitude-squared values of the summations of the products.

9. The apparatus according to claim 7, wherein:
   a maximum RE block size is based on the delay spread, and
   the candidate RE block sizes in the group are less than or equal to the maximum RE block size.

10. The apparatus according to claim 7, wherein, the hardware processing circuitry is further configured to determine the group of DMRS of the second mobile device based on a side-link identifier of the second mobile device and to determine the groups of DMRS of the one or more colliding mobile devices based on side-link identifiers of the one or more colliding mobile devices.

11. The apparatus according to claim 1, wherein the summations of the received signal values are restricted to a number of REs less than or equal to the RE block size.

12. The apparatus according to claim 1, wherein the received signal values for the REs allocated for the DMRS of the mobile device are grouped according to adjacent RE groupings.

13. The apparatus according to claim 1, wherein the mobile device is a User Equipment (UE) arranged to operate according to a Third Generation Partnership Project (3GPP) Long Term Evolution (LTE) protocol.

14. The apparatus according to claim 1, wherein the hardware processing circuitry includes baseband circuitry to determine the S-RSRP.

15. The apparatus according to claim 1, wherein the mobile device is a User Equipment (UE) and the apparatus further includes one or more antennas coupled to the transceiver circuitry for the reception of the signal.

16. A non-transitory computer-readable storage medium that stores instructions for execution by one or more processors to perform operations for communication by a mobile device, the operations to configure the one or more processors to:
configure the mobile device to receive an orthogonal frequency division multiplexed (OFDM) signal in channel resources comprising multiple resource elements (REs) from a second mobile device, wherein signal components for at least a portion of the REs are based on a group of pilot symbols;
descramble received OFDM signal components for the portion of the REs using the group of pilot symbols of the second mobile device;
determine an RE block size from among a plurality of candidate RE block sizes based on respective cross-correlations of the group of pilot symbols of the second mobile device with respective groups of pilot symbols of one or more colliding mobile devices;
determine a reference signal received power (RSRP) based on summations of blocks of the descrambled received OFDM signal components, the summations grouped according to the candidate RE block sizes.

17. The non-transitory computer-readable storage medium according to claim 16, the operations to further configure the one or more processors to:
determine, for each candidate block size of the plurality of candidate RE block sizes, a cross-correlation metric between the group of pilot symbols of the second mobile device and one or more of the groups of pilot symbols of the one or more colliding mobile devices; and
select, from the group of candidate RE block sizes and based on a minimum of the cross-correlation metrics, the RE block size to be used to determine the RSRP.

18. The non-transitory computer-readable storage medium according to claim 17, wherein a maximum value of the group of candidate RE block sizes is based at least partly on a delay spread and/or a coherence bandwidth for the OFDM signal.

19. The non-transitory computer-readable storage medium according to claim 16, wherein:
the OFDM signal is received, from the second mobile device, as part of a device-to-device (D2D) communication between the mobile device and the second mobile device,
the pilot symbols include a group of demodulation reference symbols (DMRS) that are based on a side-link identifier of the second mobile device, and
the RSRP includes a side-link RSRP (S-RSRP).

20. The non-transitory computer-readable storage medium according to claim 19, wherein the operations are to further configure the one or more processors to determine whether to continue the D2D communication with the second mobile device based at least partly on the determined S-RSRP.

21. The non-transitory computer-readable storage medium according to claim 19, wherein the summations are grouped according to an RE block size of 12 REs.

22. A method of side-link reference signal received power (S-RSRP) determination at a mobile device, the method comprising:
determining, based at least partly on a delay spread of a channel between the mobile device and a second mobile device and a cross-correlation of a group of demodulation reference symbols (DMRS) of the second mobile device with respective groups of DMRS of one or more colliding mobile devices, a resource element (RE) block size to be used for a determination of a side-link reference signal received power (S-RSRP);
receiving, from the second mobile device, a signal that is based at least partly on the group of DMRS of the second mobile device, wherein the signal is received in channel resources comprising multiple REs, a portion of the multiple REs being allocated for the DMRS; and
determining the S-RSRP based on one or more summations of received signal values for REs allocated for the group of DMRS of the second mobile device, wherein the one or more summations are based on REs spaced by less than or equal to the RE block size.

23. The method according to claim 22, wherein:
the mobile device is a User Equipment (UE) arranged to operate according to a Third Generation Partnership Project (3GPP) Long Term Evolution (LTE) protocol,
the signal is received as part of a device-to-device (D2D) communication with the second mobile device, and
the signal is received according to a side-link synchronization sub-frame (SLSS) format.

24. The method according to claim 22, wherein the S-RSRP is further based on magnitude-squared values of the summations of the received signal values descrambled by the DMRS of the second mobile device.

* * * * *